United States Patent
McCracken et al.

(10) Patent No.: US 6,448,497 B1
(45) Date of Patent: Sep. 10, 2002

(54) CABLE TRAY AND WALKWAY SYSTEM

(76) Inventors: Ronald G. McCracken, 8924 W. La., Magnolia, TX (US) 77355; Joseph Cuccurullo, 10555 Northwest Fwy., #145, Houston, TX (US) 77092

( * ) Notice: Subject to any disclaimer, the term of this patent is extended or adjusted under 35 U.S.C. 154(b) by 0 days.

(21) Appl. No.: 09/643,314

(22) Filed: Aug. 21, 2000

(51) Int. Cl.[7] ............................................. H02G 3/04
(52) U.S. Cl. ..................... 174/97; 174/39; 174/72 C; 174/99 R; 138/117
(58) Field of Search ............................ 174/39, 48, 49, 174/68.3, 72 C, 95, 96, 97, 98, 99 R; 248/49, 68.1; 52/287.1; 138/111, 112, 113, 117

(56) References Cited

U.S. PATENT DOCUMENTS

| | | | |
|---|---|---|---|
| 266,677 A | * 10/1882 | Corbett | 174/97 |
| 274,213 A | * 3/1883 | Meyer | 174/39 |
| 291,478 A | * 1/1884 | Horner | 174/39 |
| 297,463 A | * 4/1884 | Smith | 174/39 |
| 406,818 A | * 7/1889 | Cook | 174/39 |
| 434,076 A | * 8/1890 | Zopke | 174/39 |
| 659,550 A | * 10/1900 | Robertson | 174/39 |
| 698,902 A | * 4/1902 | Budd | 174/39 |
| 1,444,057 A | * 2/1923 | Bosley | 174/97 |
| 2,218,545 A | * 10/1940 | Morten | 174/39 |
| 3,420,018 A | * 1/1969 | Fork | 52/287.1 |
| 3,471,629 A | * 10/1969 | O'Leary | 174/49 |
| 3,570,546 A | 3/1971 | Jackson | |
| 3,622,687 A | * 11/1971 | Doughty | 174/97 |
| 3,659,247 A | * 4/1972 | Chaney et al. | 174/68.3 |
| 3,761,603 A | 9/1973 | Hays et al. | |
| 3,825,672 A | * 7/1974 | Malon et al. | 174/97 |
| 4,276,332 A | 6/1981 | Castle | |
| 4,349,220 A | 9/1982 | Carroll et al. | |
| 4,398,564 A | 8/1983 | Young et al. | |
| 4,612,746 A | * 9/1986 | Higgins | 52/221 |
| 4,627,203 A | * 12/1986 | Presswalla et al. | 52/221 |
| 5,095,822 A | * 3/1992 | Martin | 174/97 |
| 5,165,453 A | 11/1992 | Walker, Jr. | |
| 5,272,282 A | * 12/1993 | Wiesemann | 174/101 |
| 5,274,194 A | * 12/1993 | Belcher | 174/50 |
| 5,323,988 A | 6/1994 | Handler | |
| 5,469,893 A | * 11/1995 | Caveney et al. | 138/162 |
| 5,548,932 A | * 8/1996 | Mead | 52/126.6 |
| 6,037,543 A | * 3/2000 | Micoli et al. | 174/72 R |
| 6,107,571 A | * 8/2000 | Damm | 174/72 C |

* cited by examiner

*Primary Examiner*—Dean A. Reichard
*Assistant Examiner*—Adolfo Nino
(74) *Attorney, Agent, or Firm*—Shawn Hunter; Bracewell & Patterson, L.L.P.

(57) ABSTRACT

Devices and systems for housing cables and conduits. An exemplary cable tray is described having a number of interconnectable base members fashioned of pliable elastomer that are designed to be disposed upon a rooftop, floor or other support surface. The base members each contain a number of channels within which cables or conduits are disposed. Separate grooves are provide to retain ground wires. The base members may be formed to provide straight runs, angled turns or T-connection sections that are used as intersections. Cover pieces, also fashioned from pliable elastomer are removably affixed to the base members to enclose the cables or conduits. It is currently preferred to fashion the base member and cover components of the cable tray from crumb rubber or other recycled rubber. The components may thus be easily colored during manufacture. This same material is used for fabrication of interconnectable elements used to create walkways in accordance with the present invention.

19 Claims, 4 Drawing Sheets

CABLE TRAY AND WALKWAY SYSTEM

BACKGROUND OF THE INVENTION

1. Field of the Invention

The present invention relates to devices and methods for protecting and organizing cables and conduits as well as for providing a protective structure for the same. In other aspects, the invention is directed to devices and methods for providing walkways.

2. Description of the Related Art

On rooftops and in other locations, such as within factories and the like, cables are disposed between machines and pieces of equipment to supply electrical power, provide for control and data transfer, transmit fluids and for other purposes. However, the presence of a number of such cables and conduits can provide safety hazards as the cables may be tripped over or damaged by passing equipment such as carts or forklifts.

A solution has been to house the cables and conduits within cable trays or wire raceway devices. However, conventional cable trays and wire raceways have a number of drawbacks. First, most such devices are formed of sheet metal or other metal components which must be independently grounded.

Further, many cable trays and raceways are designed to be hung from a ceiling or overhead support thereby making access to the cables and conduits within difficult, and making their use on a rooftop impractical. A further concern is that of aesthetics. Most cable trays and conduit raceways are unsightly box like structures.

It would be an improvement to have systems and methods that address the problems of the prior art.

SUMMARY OF THE INVENTION

The present invention provides improved devices and systems for housing cables and conduits. In preferred embodiments described herein, an exemplary cable tray is provided having a number of interconnectable base members fashioned of pliable elastomer that are designed to be disposed upon a rooftop, floor or other support surface. The base members each contain a number of channels within which cables or conduits are disposed. Separate grooves are provide to retain ground wires. The base members may be formed to provide straight runs, angled turns or T-connection sections that are used as intersections. Cover pieces, also fashioned from pliable elastomer are removably affixed to the base members to enclose the cables or conduits. It is currently preferred to fashion the base member and cover components of the cable tray from crumb rubber or other recycled rubber. The components may thus be easily colored during manufacture. This same material is used for fabrication of interconnectable elements used to create walkways in accordance with the present invention.

DETAILED DESCRIPTION OF THE PREFERRED EMBODIMENTS

Figure 1:
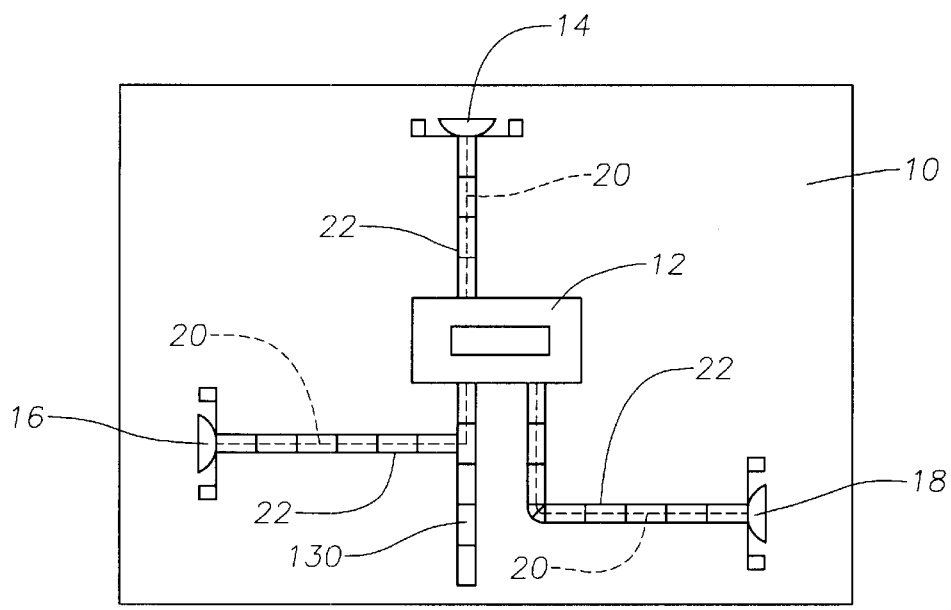
FIG. 1 is a schematic view of a rooftop having a number of cable trays placed in use thereupon.

Cable trays in accordance with the present invention may be constructed using variations of different components to form cable trays having a desired configuration for the housing of cables. These components include straight runs, T-connections and angled sections. Cable trays constructed in accordance with the present invention are capable of use in any environment where cabling, including fluid transfer conduits and electrical transmission cables, is located. For illustration, FIG. 1 depicts a rooftop 10, shown in plan view. A telecommunications equipment shelter 12 is centrally located upon the rooftop 10 and three telecommunications antennas 14, 16 and 18 are located proximate the sides of the rooftop 10. Electrical and data cables, shown schematically using dotted lines 20, extend from the equipment shelter 12 to each antenna 14, 16 and 18. The cables 20 are protected and organized within cable trays 22 that are disposed upon the rooftop 10.

Figure 2:
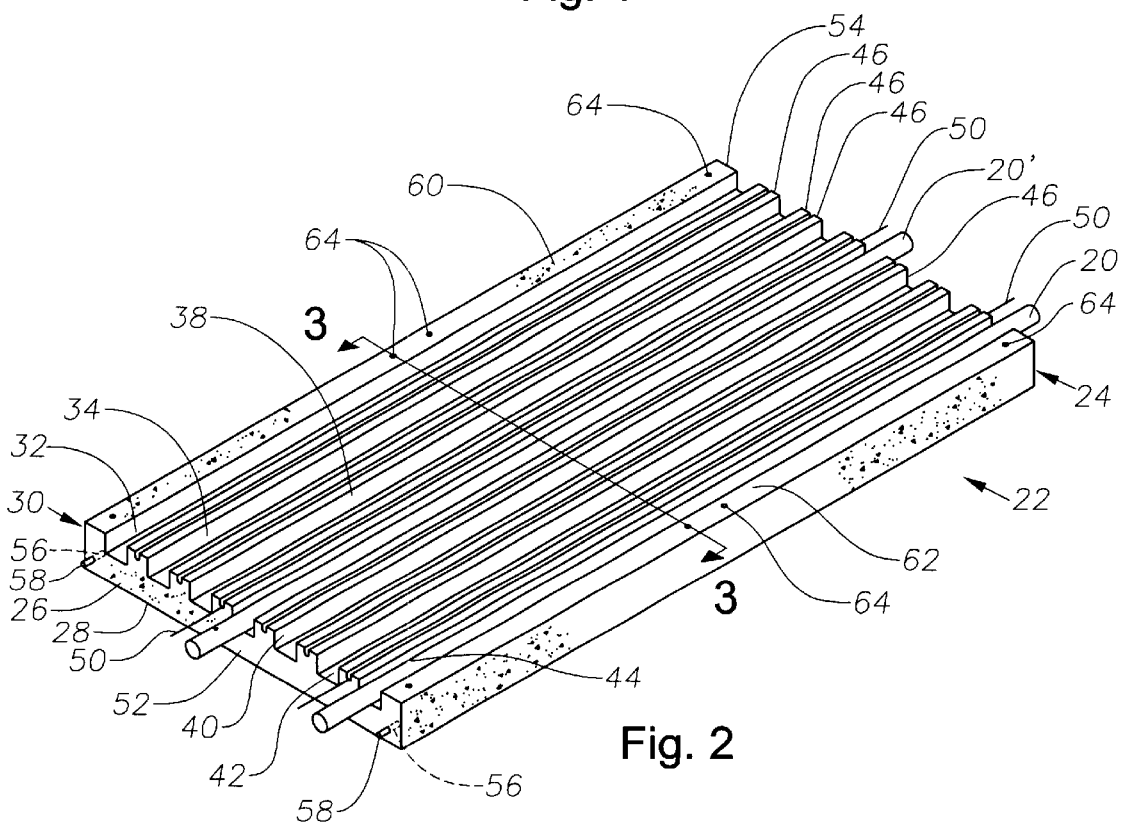
FIG. 2 is an isometric view of the base member of an exemplary straight run portion for an exemplary cable tray constructed in accordance with the present invention.
Figure 3:
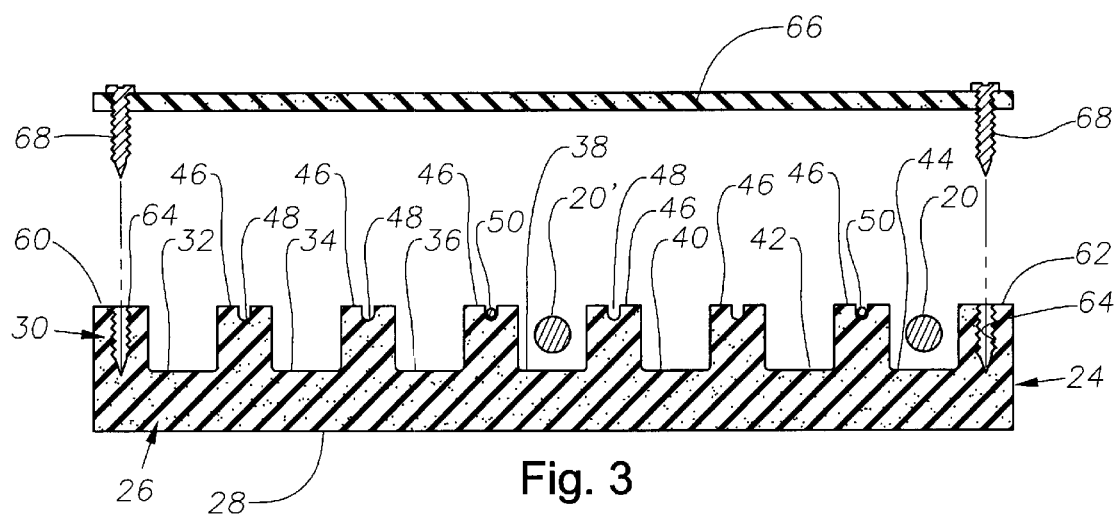
FIG. 3 is a cutaway view of a base member taken along lines 3—3 in FIG. 2 and also showing an exemplary cover piece.

FIGS. 2 and 3 illustrate a portion of one of the exemplary cable trays 22. More specifically, a standard, straight-run base member 24 is shown retaining portions of cables 20, 20'. Because the base member 24 is formed to accommodate straight runs of cables, it is substantially rectangular in shape. The base member 24 includes a lower section 26 having a substantially flat bottom surface 28 so that the base member 24 may be disposed upon a rooftop, floor or other support surface.

The base member 24 also has an upper section 30 having a plurality of cable-retainment channels 32, 34,36, 38,40,42 and 44 that are shaped and sized to receive a cable of desired size. Each of the channels 32, 34, 36, 38, 40, 42 and 44 provide a rectangular cross-section. However, channels having an arcuate cross-section may also be used. Cables 20, 20' are shown disposed within channels 38, 44 of the base member 24. The remaining channels 32, 34, 36, 40 and 42 are shown to be empty. However, it will be understood that each of these channels may also carry cables. Spacer portions 46 are disposed between adjacent channels. Ground wire grooves 48 are disposed along the upper surfaces of each spacer portion 46. These grooves 48 are smaller than the cable-retaining channels 32, 34, 36,38,40,42 and 44, and are specifically shaped and sized to retain ground wiring. Ground wires 50 are shown disposed in two of the grooves 48.

The longitudinal ends 52, 54 of the base member 24 each have a pair of blind bores 56 disposed within them. The blind bores 56 are shaped and sized to retain approximately one-half the length of wooden or metal dowels 58 in an interference fit. As a result, adjoining base members, such as base members 24 may be joined together in an end to end relation.

As FIGS. 2 and 3 show, upper surface of the lateral sides 60, 62 of the base member 24 contain a number of apertures 64 into which complimentary-shaped connectors may be disposed for the affixation of a cover piece to the base member.

The base member 24 is formed of a pliable elastomeric material that is non-conductive. It is currently preferred that these components be formed of recycled rubber from tires or other recycled rubber materials. However, the invention is not intended to the use of these materials. It is currently particularly preferred to use a crumb rubber that can be compression molded. This type of material may easily be dyed or colored during manufacture of the base member 24 so that a desired color for the product is provided.

FIG. 3 illustrates a first type of cover piece 66 that can be affixed to the base member 24. This cover piece 66 is essentially a flat rectangular member that is shaped and sized to be secured to the upper section 30 of the base member 24. Connectors 68 are disposed through the cover piece 66 and into the apertures 64 to affix the cover piece 66 to the base member 24. The cover piece 66 is preferably formed of the same type of non-conductive material as the base member 24. When the cover piece 66 is affixed in this manner, the cables 20, 20' and ground wiring 50 are protected from hazards such as foot traffic and sharp objects. The cables 20,20' and ground wiring 50 are further protected from crushing by the spacers 46 which will help to support heavy objects placed atop the cable tray 22.

Figure 4:
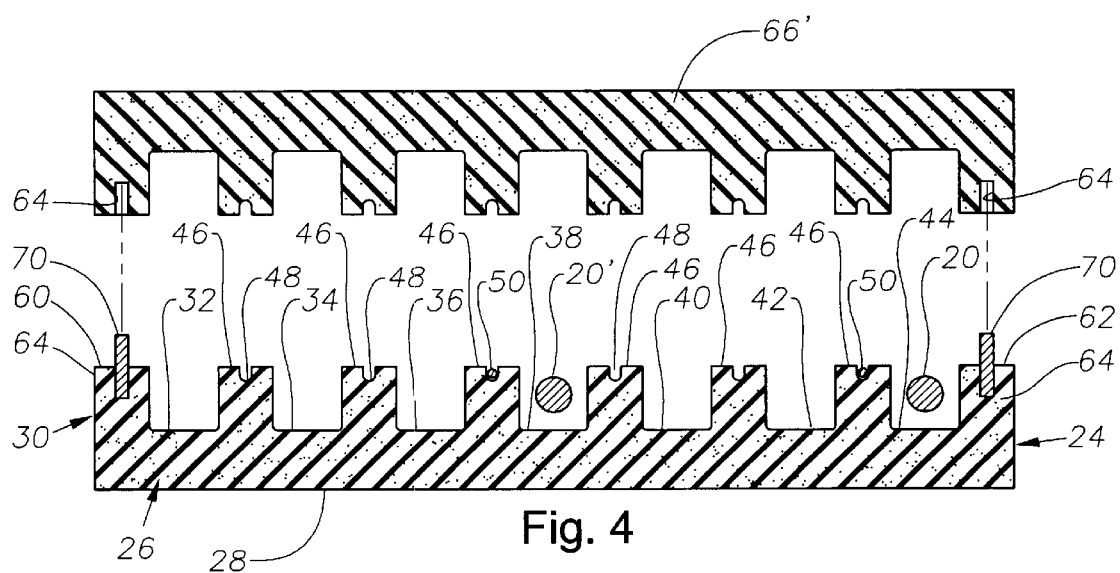
FIG. 4 is a cutaway view of an alternative embodiment for an exemplary cable tray wherein a matching grooved component is used as a cover portion.

FIG. 4 illustrates an alternative embodiment for a straight-run cable tray section wherein the cover piece 66' is provided by a like base member. Dowels 70 are disposed in adjoining apertures 64 in both the cover piece 66' and the base member 24.

Figure 5:
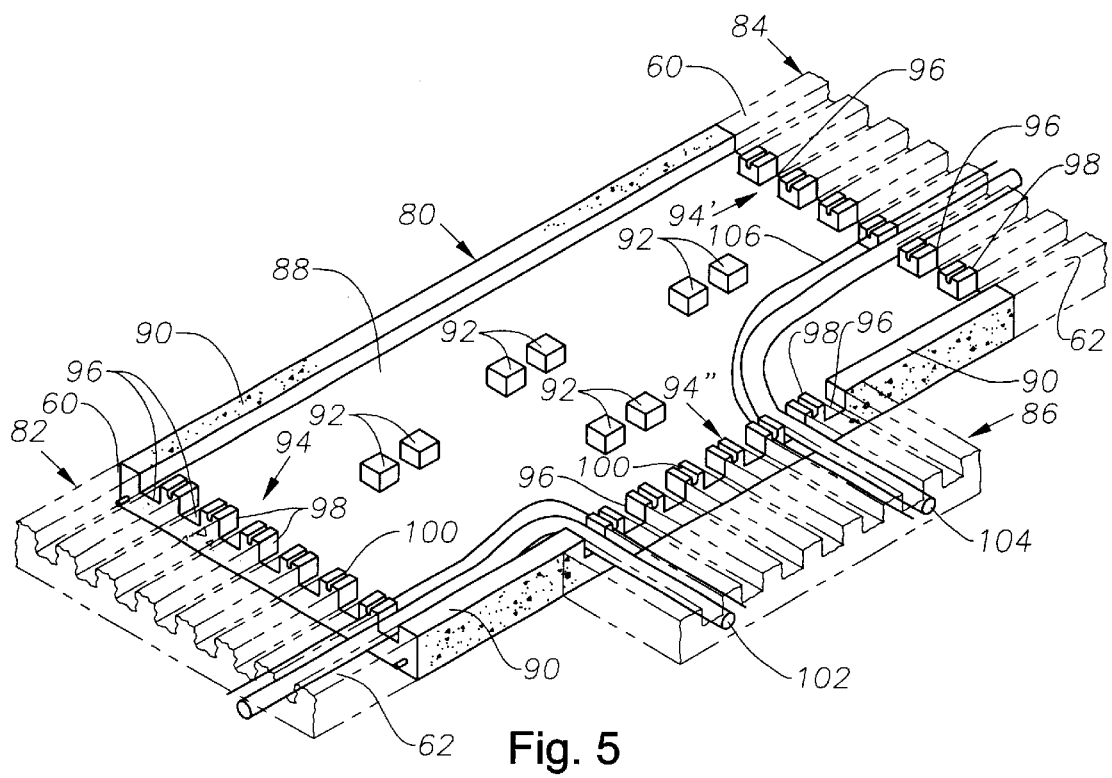
FIG. 5 is an isometric view of an exemplary T-connection base member.
Figure 6:
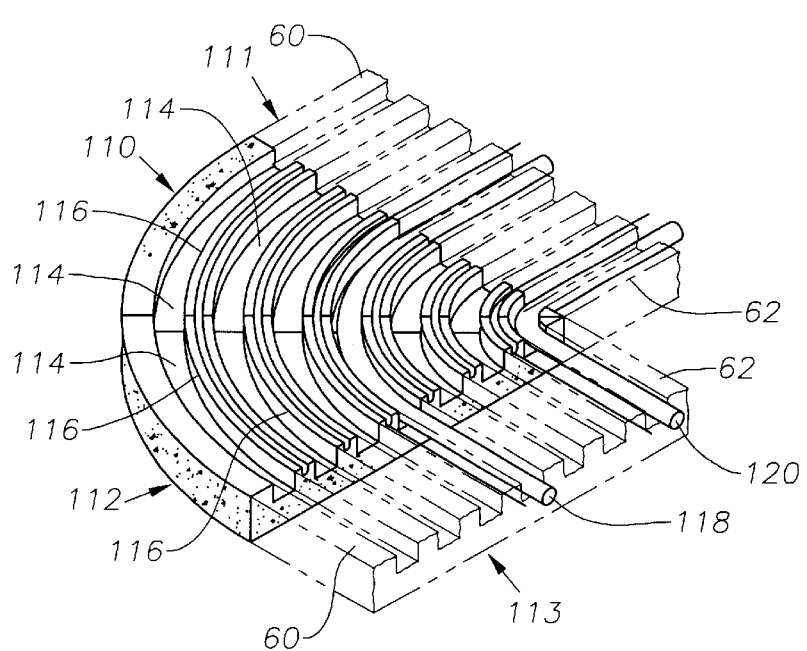
FIG. 6 is an isometric view of a pair of corner-type base members.

Referring now to FIGS. 5 and 6, additional components are illustrated that are useful in forming cable trays. FIG. 5 illustrates an exemplary T-connection base member 80 that is useful for interconnecting cables at an intersection or for directing cables into two divergent directions. The base member 80 is shown interconnected to adjoining base members 82, 84 and 86, which are depicted in phantom. The base member 80 has an elongated rectangular shape and includes a substantially flat lower section 88 with raised edges 90 on either lateral side. These raised edges 90 are shaped and sized to match the dimensions of the lateral side 60, 62 of straight-run base members 24.

A number of support blocks 92 are disposed upon the flat lower section 88. The support blocks 92 are fashioned from the same non-conductive material as the rest of the base member 80 and may be affixed to the flat lower section 88 by means of glue or connectors or may be integrally molded to the lower section 88. There are three cable retaining sections 94,94' and 94" located around the periphery of the base member 80. Cable retaining sections 94 and 94' are located at either longitudinal end of the base member 80, while cable retaining section 94" is located along one lateral side of the base member 80.

Each cable retaining section 94 has a plurality of cable-retaining channels 96 that are separated from one another by spacers 98. Ground wire grooves 100 are disposed within the upper surfaces of the spacers 98.

Cables 102 and 104 are shown entering the lateral cable retaining section 94" and then diverging so that cable 102 exits the cable retaining section 94 at one end and the cable 104 exits the cable retaining section 94' at the opposite end. A ground wire 106 also enters the lateral cable retaining section 94" and exits through the cable retaining section 94' It can be seen, then, that the base member 80 acts as an intersection that permits cables to be joined or diverged from one another.

A cover piece (not shown) is normally affixed to the upper surface of the base member 80 to protectively enclose the cables 102, 104 and ground wire 106. The cover piece is preferably of the same construction as the flat style cover piece 66 described and is shaped and sized to be complimentary to the shape of the base member 80.

FIG. 6 illustrates a pair of angled base members 110, 112 that have been interconnected with one another. Although not shown, it should be understood that these components are affixed to one another using blind bores and dowels, similar to the blind bores 56 and dowels 58 discussed previously. It is also noted that the base members 110, 112 are shown to be interconnected with additional base members 111, 113 (shown in phantom) that may be straight run-type base members like base member 24 or T-connection base members like base member 80.

The base members 110, 112 contain channels 114 and spacers 116 as well as ground wire grooves 118 that are similar in construction to the grooves, spacers and ground wire grooves described earlier. Each of the base members 110, 112 is arcuately curved to form an arcuate segment that is approximately 45° of a circle. When the two base members 110, 112 are affixed together, they form an approximate 90° arcuate segment. The base members 110, 112 are curved in this manner to permit the cables 118, 120 shown disposed therein to be disposed around corners or otherwise angularly diverted. If it is desired to angularly redirect retained cables less than 90 degrees, a single base member 110 may be used rather than both base members 110, 112. Again, suitably sized and shaped cover pieces are secured over the base members 110, 112 to protectively enclose the cables 110, 112.

In use, cable trays are formed by an assembly of suitable base member components within which cables and ground wiring are disposed. This modular construction permits a cable tray of suitable capacity, length and geometry to be easily created. The base members are then enclosed with cover pieces. Because the base members and cover pieces are formed of a non-conductive material, the cable tray created provides a measure of protection in the event of a failure or rupture of the cables that would expose electrical wiring within the cabling resulting in a hazard. Further, no separate grounding clips or wires are necessary to ground the cables. The base members and cover portions are further preferably formed by compression molding using techniques that are known in the art.

The modular construction of the cable trays of the present invention also permits the base members and cover pieces to be pre-formed as easily transportable sections. These pre-formed sections should have convenient standard lengths, such as 6 feet, which allows the sections to be stacked and palletized so that they may be easily stored and transported. Further, the use of standard-sized sections simplifies material planning and ordering for users.

Figure 7:
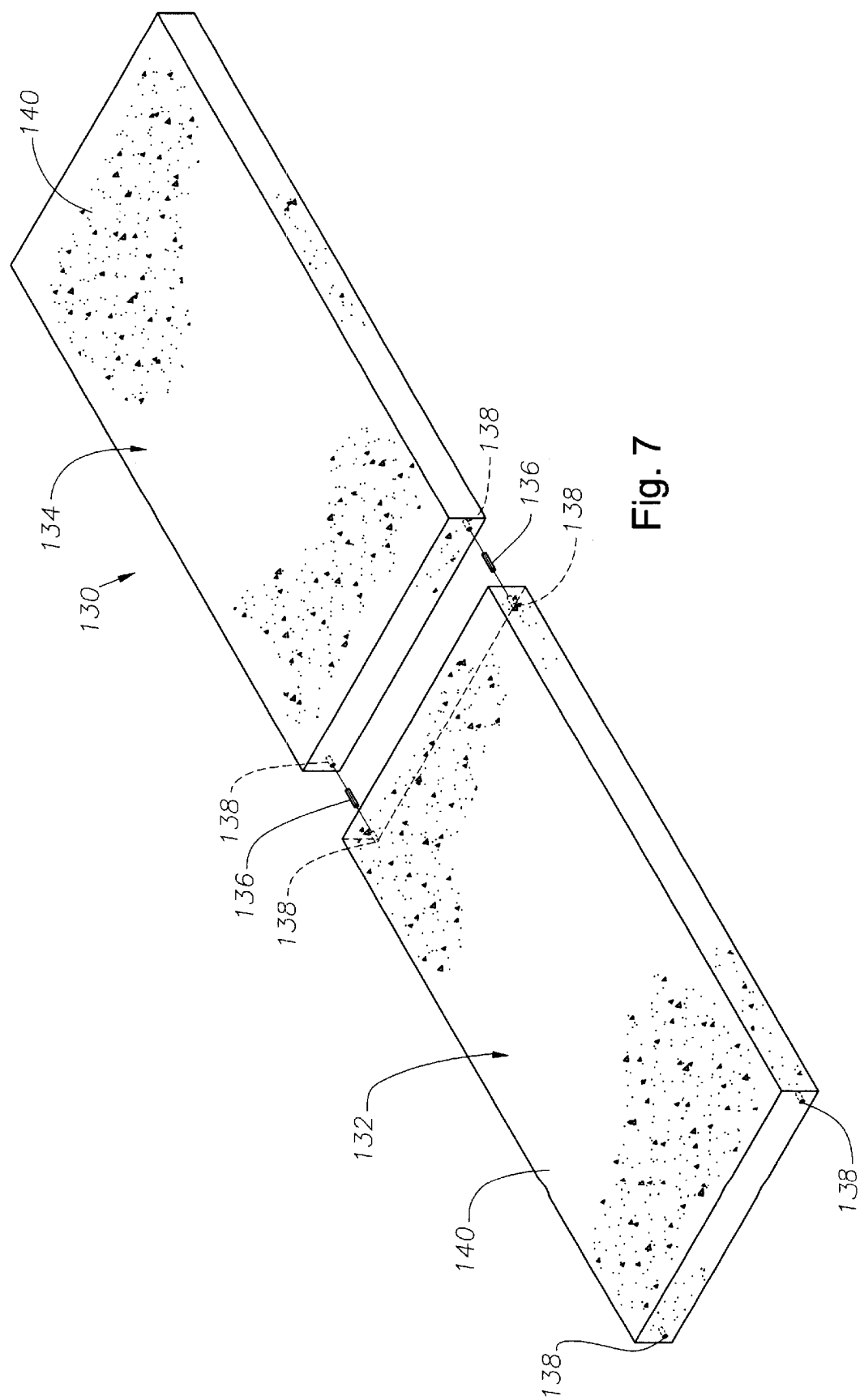
FIG. 7 is an isometric view of a pair of walkway members.

Referring once again to FIG. 1, a walkway 130 is shown schematically to adjoin one of the cable trays 22. The walkway 130 is formed of the same non-conductive, preferably elastomeric material as the cable tray components. As FIG. 7 illustrates, the walkway 130 is formed of solid, block-like elements 132, 134 that are interconnected with one another in an end-to-end relation using dowels 136 and blind bores 138. The blind bores 138 are preferably sized the same as the blind bores used with the base members 24, 80, 110, 112 of a cable tray and placed in matching locations so that block-like elements of a walkway may be affixed to the end of a cable tray base section, as FIG. 1 shows. Each of the walkway elements 132, 134 presents an upper wear surface 140 to receive foot traffic and other traffic. The thickness of the walkway elements 132, 134 is chosen to approximate the height of a cable tray base member with a cover affixed thereto. As a result, when interconnected with cable tray base members, the walkway elements form a portion of a cable tray assembly that provides an upper walkway surface that is substantially continuous, that walkway surface is formed from the upper surfaces of the base member cover pieces, such as cover pieces 66 or 66' and the upper wear surfaces 140 of the walkway elements 132, 134.

While the invention has been shown or described in only some of its forms, it should be apparent to those skilled in the art that it is not so limited, but is susceptible to various changes within departing from the scope of the invention.

What is claimed is:

1. A cable tray for retaining a plurality of cables comprising:
   - at least one base member substantially formed of a molded non-conductive material, the base member having a body that defines a plurality of channels for retaining cables; and
   - a groove for retaining ground wiring, the groove being located in an upper surface of a spacer portion disposed between adjacent channels.

2. The cable tray of claim 1 wherein the molded non-conductive material comprises crumb rubber.

3. The cable tray of claim 1 wherein the base member is a straight-run base member that maintains a retained cable in a substantially straight line.

4. The cable tray of claim 1 wherein the base member is a curved base member that disposes a retained cable along an arcuate segment.

5. The cable tray of claim 1 wherein the base member is a T-connection base member for diverting or intersecting cables, the T-connection base member having a periphery and three cable retaining sections disposed within the periphery.

6. The cable tray of claim 1 further comprising a cover piece that is removably affixable to the base member.

7. The cable tray of claim 6 wherein the cover piece is substantially formed of a molded non-conductive material.

8. A cable tray assembly for retaining a plurality of cables, the assembly comprising:
   - at least one base member for retaining a plurality of cables;
   - a cover piece that is removably affixable to the base member for enclosing a plurality of cables; and
   - a walkway element that is interconnectable with an end of the base member.

9. The cable tray assembly of claim 8 wherein the base member is substantially formed of a non-conductive, elastomeric material.

10. The cable tray assembly of claim 8 wherein the walkway element is substantially formed of a non-conductive, elastomeric material.

11. The cable tray assembly of claim 8 wherein the base member is interconnectable with the walkway element using mating dowels and recesses.

12. The cable tray assembly of claim 8 wherein the base member comprises a plurality of longitudinal channels for retaining cables or conduits therewithin.

13. The cable tray assembly of claim 12 wherein the base member comprises:
   - a spacer portion disposed between adjacent channels; and
   - a groove disposed within an upper surface of the spacer portion, the groove being shaped and sized to retain a ground wire.

14. The cable tray assembly of claim 8 wherein the cover piece comprises a like base member.

15. The cable tray assembly of claim 8 wherein the base member presents a substantially flat surface.

16. The cable tray assembly of claim 8 wherein the base member is formed of crumb rubber.

17. The cable tray of claim 8 wherein the base member is a straight-run base member that maintains a retained cable in a substantially straight line.

18. The cable tray of claim 8 wherein the base member is a curved base member that disposes a retained cable along an arcuate segment.

19. The cable tray of claim 8 wherein the base member is a T-connection base member for diverting or intersecting cables, the T-connection base member having a periphery and three cable retaining sections disposed within the periphery.

* * * * *